May 9, 1950     J. B. OLSON     2,506,735
PRESSURE CONTROL VALVE

Filed June 2, 1945     2 Sheets-Sheet 1

INVENTOR.
JOHN B. OLSON
BY
ATTORNEY

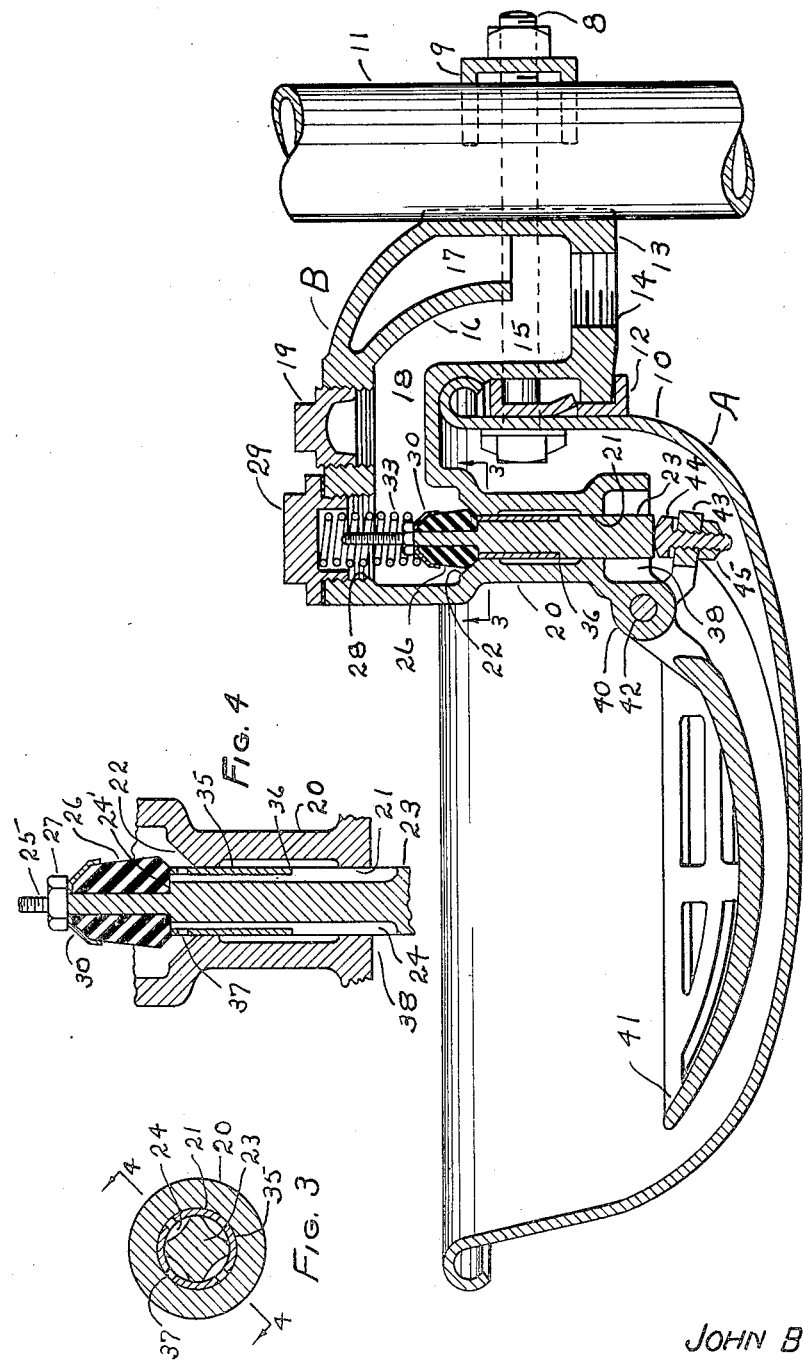

Patented May 9, 1950

2,506,735

UNITED STATES PATENT OFFICE 2,506,735

PRESSURE CONTROL VALVE

John B. Olson, Fort Atkinson, Wis., assignor to James Manufacturing Company, Fort Atkinson, Wis., a company of Wisconsin Application June 2, 1945, Serial No. 597,316

2 Claims. (Cl. 119—75)

The present invention refers principally to valves used for feeding water into watering bowls used largely in dairy barns, the object of the invention being to provide simple and inexpensive means for controlling or modulating the speed of flow of the water into the bowl regardless of the pressure of the water in the supply pipe.

In some installations the pressure of the water in the supply lines is very low and in other supply lines the pressure is very high. When the pressure is high and the valve is opened by pressure of the cow's nose on the paddle, the water rushes into the bowl at great speed and slops over the edge of the bowl or fills the bowl. This is not desirable for obvious reasons. Furthermore it, to some extent, disturbs the animal and interferes with comfortable drinking.

The desired condition in a water bowl is to modulate the flow of water through the valve so there is no agitation of the water in the bowl.

I accomplish the desired results by supplying a conventional valve with a regulating sleeve and provide means whereby this valve can be easily removed and whereby by simply turning the sleeve with the fingers, the flow of water may be determined, irrespective of the pressure in the supply line.

To these and other useful ends my invention consists of parts, combinations of parts or their equivalents and mode of operation as hereinafter described and claimed and shown in the accompanying drawings in which:

Fig. 2 is a sectional view taken on line 2—2 of Figure 1.

Fig. 3 is an enlarged sectional view taken on line 3—3 of Figure 2.

Fig. 4 is an enlarged fractional longitudinal sectional valve and seat showing the valve open.

Figure 1:
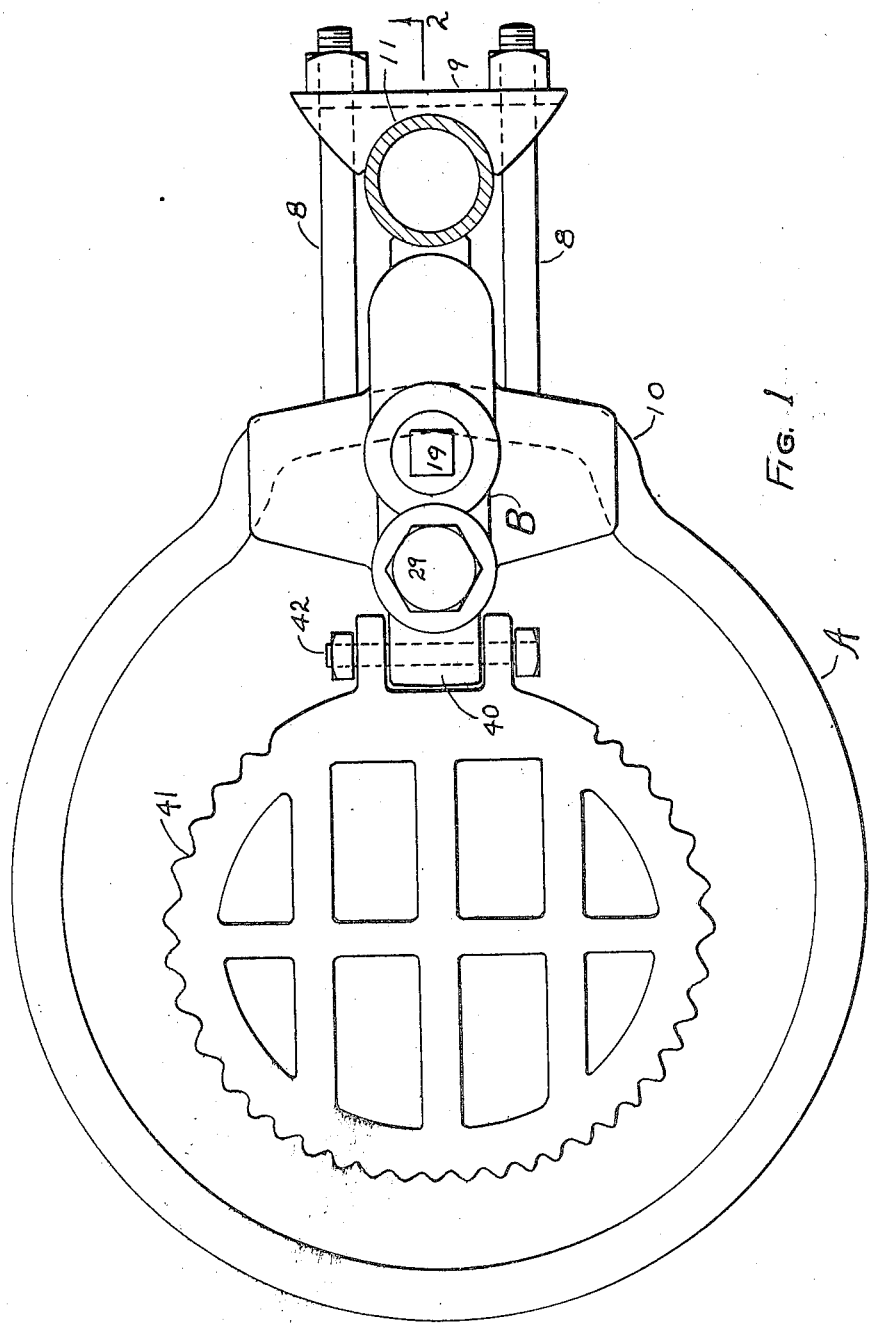
Fig. 1 is a top view of my device.

In the figures the bowl is designated by reference character A and the valve in its entirety is designated by reference character B. Bowl A is preferably pressed from flat stock to the shape shown, the bulged portion 10 adding strength to the bowl for its fastening to valve B, which in turn is secured to the supporting pipe 11 as follows:

I provide a pressed steel stiffening plate 12 which is secured to the rear surface of member 10 preferably by electric welding. Valve B is supplied with a depending extension 13 having a pipe threaded inlet 14. Member 13 is shaped so as to form an inlet chamber 15 having a partition 16 forming an air chamber 17. The assembly as shown is held together by means of two bolts 8—8 and a plate 9. Chamber 15 has a rearwardly extending port 18 at its top, this port having a screw-threaded opening for the reception of a pipe plug 19. The valve part of member B consists of a depending chamber 20. Chamber 20 is provided with an opening 21 terminating at its top in a valve seat 22. A valve stem 23 is provided having preferably four longitudinal grooves 24 in its periphery, which terminate near the bottom of stem 23, the upper end of member 23 being offset as at 24' forming a stem 25.

I provide a valve 26 preferably of synthetic rubber which is held on offset 24' by means of a nut 27. A screw-threaded opening 28 is provided for the reception of a cap 29. I provide a cap 30 for member 26 on which nut 27 rests. I provide a spring 33 which is adapted to yieldingly hold valve 26 on seat 22. I provide a sleeve 35 which is snugly but rotatably mounted on member 23 resting at its bottom on a narrow ledge 36 and at its top against valve 26 and at a slight pressure against the valve, thus to hold sleeve 35 permanently in its adjusted position. Near the top of sleeve 35 I provide preferably four small apertures 37.

In Figure 3, apertures 37 are shown positioned over grooves 24 which is the proper adjustment for a low pressure water supply. For higher pressures the sleeve may be turned so apertures 37 are partially or almost wholly covered by the portion of stem 23 between grooves 24, thus to determine the speed of flow of water into the bowl through grooves 24 and chamber 38 without unduly agitating the water in the bowl and at a speed which will never be very much greater than required by the animal when drinking.

The bottom of member 20 is supplied with an ear 40 to which paddle 41 is pivoted on a pin 42. Member 41 is designed to straddle member 40 adjacent the pivot and having a pad 43 in which a bolt 44 is screw-threaded having a lock nut 45. It will be seen that as the parts wear bolt 44 may be adjusted upwardly so as to readjust paddle 41 to a desired position.

Clearly the flow of water into the bowl will be modulated and at a speed so as not to cause turbulence and whereby the animal will not be startled or disturbed when the valve is opened.

It will be seen that I have provided a means for modulating the flow of water into a water bowl and at a very nominal cost; that the control provided is easily understood and easily operated by an attendant and that the device is simple, efficient and easily manufactured at low cost.

Having thus shown and described my invention I claim:

1. A device of the character described comprising; a drinking bowl having positioned therein a depending valve housing, a nonmetallic valve having a stem which extends through said housing and a spring adapted to hold the valve on its seat, a paddle in the bowl near the bottom thereof having an operating connection to the valve stem, a sleeve manually turnably mounted on the stem and extending from the valve to a seat on the stem, said valve adapted to yieldingly hold the sleeve on its seat, a number of grooves in the stem of said valve having outlets into said bowl, apertures in the top of said sleeve which register with the grooves adapted to be optionally more or less exposed to the grooves and permit a predetermined volume of water to flow in the groove and to the bowl when the valve is opened.

2. A device of the character described comprising; a drinking bowl having positioned therein a valve housing which terminates below the normal water level, a valve in said valve housing having a valve stem which extends downwardly through the valve housing, a spring adapted to hold the valve on its seat, a paddle near the bottom of said bowl having an operating connection to said valve stem whereby when the paddle is pressed downwardly the valve will be opened, said valve housing extending outwardly over the top of the bowl and then downwardly and having a water inlet connection at its bottom and a port which extends to said valve, an air chamber in said downwardly extending housing member having an inlet at its bottom adjacent said first inlet, an inverted cup shaped enlarged opening in the bottom of said valve housing into which the valve stem extends, a number of grooves in said valve stem and extending into said cup shaped opening thereby to divide and soften the flow of water and air into the bowl and below the normal water level.

JOHN B. OLSON.

REFERENCES CITED

The following references are of record in the file of this patent:

UNITED STATES PATENTS

| Number | Name | Date |
| --- | --- | --- |
| 909,282 | Cheevers | Jan. 12, 1909 |
| 956,158 | Pasman | Apr. 26, 1910 |
| 1,296,586 | Louden | Mar. 4, 1919 |
| 1,337,636 | Bogda | Apr. 20, 1920 |
| 1,344,189 | Rassmann | June 22, 1920 |
| 1,402,653 | Rassmann | Jan. 3, 1922 |
| 2,021,337 | Trefz | Nov. 19, 1935 |